United States Patent [19]

Peelor et al.

[11] Patent Number: 5,338,776
[45] Date of Patent: Aug. 16, 1994

[54] TIRE SEALER AND INFLATOR

[75] Inventors: Philip L. Peelor, Mentor; John J. Moran, Willoughby Hills, both of Ohio; Lloyd T. Flanner, Nags Head, N.C.

[73] Assignee: Aerosol Systems, Inc., Macedonia, Ohio

[21] Appl. No.: 150,585

[22] Filed: Nov. 10, 1993

Related U.S. Application Data

[63] Continuation of Ser. No. 837,376, Feb. 14, 1992, abandoned.

[51] Int. Cl.$^5$ .................. C08K 3/36; C08L 15/02
[52] U.S. Cl. .................. 523/166; 152/503; 152/504; 152/509; 524/533; 521/78
[58] Field of Search ............. 523/166; 152/503, 504, 152/509; 521/78

[56] References Cited

U.S. PATENT DOCUMENTS

| | | | |
|---|---|---|---|
| 2,991,629 | 7/1961 | Rose | 62/48 |
| 3,843,586 | 10/1974 | Wolf | 252/305 |
| 3,912,665 | 10/1975 | Spitzer et al. | 521/78 |
| 3,912,666 | 10/1975 | Spitzer et al. | 521/78 |
| 3,912,667 | 10/1975 | Spitzer et al. | 521/78 |
| 4,300,614 | 11/1981 | Kageyama et al. | 152/347 |
| 4,328,319 | 5/1982 | Osipow et al. | 521/79 |
| 4,422,877 | 12/1983 | Spitzer et al. | 521/79 |
| 4,501,825 | 2/1985 | Magyar et al. | 521/71 |
| 4,607,065 | 8/1986 | Kitamura et al. | 522/83 |
| 4,659,589 | 4/1987 | Jimenez | 427/140 |
| 4,970,242 | 11/1990 | Lehman | 521/78 |
| 4,996,240 | 2/1991 | Osipow et al. | 521/78 |

*Primary Examiner*—Morton Foelak
*Attorney, Agent, or Firm*—Oldham, Oldham & Wilson Co.

[57] ABSTRACT

A tire sealant and inflator composition for the repair of puncture wounds in pneumatic tires and the like. The composition utilizes a sealing component consisting of an acrylic resin dissolved in a suitable solvent and a hydrochlorofluorocarbon and/or hydrofluorocarbon propellant component to deliver the sealing component from an aerosol container into the tire to a driveable state.

30 Claims, No Drawings

TIRE SEALER AND INFLATOR

This is a continuation of copending U.S. patent application(s) Ser. No. 07/837,376 filed on Feb. 14, 1992, abandoned.

The present invention relates to a novel anhydrous, essentially non-flammable sealant and inflator composition and more specifically to a tire sealant and inflator composition utilizing an acrylic base resin in combination with a hydrochlorofluorocarbon or hydroflurocarbon base propellant useful for sealing and inflating pneumatic tires and the like.

BACKGROUND OF THE INVENTION

Single use aerosol tire sealant and inflator kits are generally well known and are useful for emergency or prompt repair of a puncture wound in a pneumatic tire. Generally, such kits comprise a conventional aerosol can containing the particular composition which is introduced into the cavity of the pneumatic tire through the valve stem. Typically, a length of flexible tubing connects a valve on the can with a threaded nozzle and connector on the remote end for attachment to and activation of the valve stem. Alternately, the can is supplied with a pedestal valve for activation and dispensing of the contents without flexible tubing. A propellant within the can forces the composition through the opened valve and into the tire, thereby serving to inflate the tire.

Generally, tire sealant and inflator kits provide quick but primarily temporary assistance to motorists experiencing a punctured tire on the highway or other inconvenient location, removed from accessibility to necessary service facilities or equipment. Alternatively, it is often unsafe or too time consuming to remove the tire and replace it with a spare tire at the location of the disabled automobile.

Many prior art tire sealer and inflator systems utilize water-based sealants which are less effective in cold climatic conditions.

These and other prior art compositions have utilized flammable hydrocarbon propellants and/or chlorofluorocarbon (CFC) propellants known to contribute to depletion of the earth's ozone layer. Still other compositions such as U.S. Pat. No. 4,970,242 to Lehman utilizes a multi-part resin system wherein a tackifying and hardening resin are used to modify the resin that is present in a common solvent. The Lehman patent utilizes a hydrochloroflurocarbon (HCFC) propellant which contributes less to the depletion of the earth's ozone layer than chlorofluorocarbons.

Due to the deficiencies and/or limitations of the prior art, Applicants' novel sealant and inflator system is subsequently presented.

SUMMARY OF THE INVENTION

Briefly, stated, the present invention provides a novel sealant and inflator composition for the repair of puncture wounds in pneumatic tires and the like. Applicants' composition comprises generally a one-part acrylic resin soluble in a suitable solvent in combination with a hydrochlorofluorocarbon (HCFC) or hydroflurocarbon (HFC) based propellant. The present invention is characterized as being anhydrous and essentially non-flammable, possessing excellent adhesion and sealing to the interior surface of the tire and the puncture site.

It is, therefore, a principal object of this invention to provide a tire sealant and inflator composition capable of sealing a puncture wound in a tire and inflating the tire to a drivable state.

It is further object of the present invention to provide an aerosol tire sealant and inflator composition which is essentially non-flammable.

It is still a further object of the present invention to provide an aerosol tire sealant and inflator kit utilizing propellant which minimizes detrimental effects to the earth's atmosphere as compared to propellants used in the prior art.

It is yet a further object of the present invention to provide an aerosol tire sealant and inflator composition which is capable of quickly, safely and effectively sealing puncture wounds in the vehicle tires and inflating the same to a drivable state.

It is further an object of the present invention to provide and aerosol tire sealant and inflator composition in which the seal created is an essentially permanent seal of a puncture wound.

These and other objects and advantages will become more readily apparent from the detailed description taken in conjunction with the provided examples. Such objects and advantages are achieved by a tire sealant and inflator composition comprising: 10 to 90 weight percent of a hydrochlorofluorocarbon or hydrofluorocarbon based propellant such as chlorodifluoromethane; 10 to 90 weight percent of a suitable solvent such as perchloroethylene and/or 1,1,1 trichloroethane and 0.1 to 30 weight percent of an acrylic resin such as DORESCO ®acrylic resin AC 209-13.

DETAILED DESCRIPTION OF THE PREFERRED EMBODIMENT

This invention will be described in detail with reference to the preferred embodiments and further illustrated by the examples provided herein.

As previously stated, the present invention is intended to provide an aerosol. tire and sealant product capable of sealing a puncture wound in a pneumatic tire and inflating the same tire to a pressure suitable for driving. The present invention achieving the objectives and advantages previously set out herein comprises generally: an acrylic resin present in an amount of about 0.1 to about 30 weight percent; a solvent or solvent blend capable of dissolving the aforementioned resin present in an amount ranging from about 10-90 weight percent and a hydrochlorofluorocarbon (HCFC) and/or hydroflurocarbon (HFC) based propellant present in an amount ranging from about 90-10 weight percent.

Typically, this composition is prepared and dispensed in a conventional aerosol can ranging from 6-24 ounces in size, although a person of ordinary skill in the art could easily package the same in various sizes. The composition of the present invention is packaged with sufficient propellant to inflate conventional pneumatic tires and the like, typically pressurized in the can at a range between 30-100 psig at 70° Fahrenheit and should not exceed 180 psig at 130° F.

A tire sealant and inflator composition must have certain specific characteristics in order to be useful. The sealant component must exhibit sufficient adhesiveness to the inner wall of the tire and/or the puncturing object if it remains in the tire and be able to withstand some shifting by the latter. The seal must be capable of withstanding the internal pressure of the inflated tire and deflection of the tire's purely circular shape as the puncture site moves through the footprint of the tire. Finally, the composition, including sealant and propellant must not cause deterioration or damage to the tire or rim.

Hydrochloroflurocarbon propellants (hereinafter HCFC) are the preferred inflator and propellant components for use in the present invention in that they are equivalent in terms of propellant qualities to the alternative chlorofluorocarbons (CFC) and hydrocarbon propellants, such as butanes, propanes, etc. Yet, hydrochloroflurocarbons (HCFC) are not thought to contribute to the deterioration of the earth's ozone layer to the same extent as do chlorofluorocarbon (CFC) propellants. Additionally, many of the preferred hydrochlorofluorocarbon (HCFC) propellants are non-flammable, in contrast to conventional hydrocarbon propellants and dimethyl ether (DME).

Applicant's preferred hydrochlorofluorocarbon propellant is chlorodifluoromethane commonly sold and referred to under trademarks such as Genetron® 22 and Dymel® 22. This is a preferred propellant because it does not have a flash point and is non-flammable. Tetrafluoroethane, a hydrofluorocarbon (HFC) propellant, represents another propellant which is nonflammable and contains no chlorine and is, therefore, not thought to contribute to ozone deterioration.

These propellants are also contemplated as being combined in a propellant system or blended with various other HCFC, HFC, CFC, DME and/or hydrocarbon propellants and/or solvents in varying proportions and in such a manner so as to yield an effective, essentially non-flammable and cost efficient inflator component with minimal, if any adverse effect on the environment. Such compounds include but are not limited to: HCFC's (dichlorotrifluoroethane, dichloromonofluoroethane, monochlorodifluoroethane and tetrafluorochloroethane); hydrofluorocarbons (trifluoroethane and difluoroethane); hydrocarbons (propane, isobutane, n-butane); dimethyl ether; and chlorofluorocarbons (dichlorodifluoromethane, trichlorofluoromethane, trichlorotrifluoroethane, and dichlorotetrafluoroethane). Although CFCs represent viable propellants, alone or in combination with other propellants, they are undesirable for reasons disclosed elsewhere herein and future use will likely be severely restricted under proposed regulatory legislation.

HCFCs and HFCs can be used in combination with known hydrocarbon propellants and/or DME yet remain essentially nonflammable as will be illustrated subsequently herein.

The resin component of applicants' sealant and inflator composition consists of an acrylic resin in solution and is characterized by a high tensile strength, suitable pliability and good adhesion to the inner surface of the tire. The preferred resin is identified as AC209-13 sold under the trademark Doresco® by the Dock Resin Corporation of Linden, New Jersey. This resin is a polymer made entirely of acrylic and methacrylic monomers and exhibits high thermal stability, thereby maintaining its integrity even at high operating temperatures and further has a low secondary transition temperature so as not to become brittle at low operating temperatures. More specifically, AC209-13 is a co-polymer comprising an aklyl ester of acrylic acid and an alkyl ester of methacrylic acid, the co-polymer having a glass transition temperature of less than 20° C. This resin, as supplied, is dissolved in a suitable solvent such as perchloroethylene, although other solvents, preferably nonflammable are contemplated including 1,1,1 trichloroethane. This resin composition comprises approximately 35% non-volatile solvent. The resin is characteristically present in the sealant component at a range of about 0.1 to 30 weight percent of nonvolatile solid dissolved in a suitable solvent. In a preferred embodiment, the resin solid is present in the sealant component in an amount of 2 to about 15 weight percent, and most preferably from 3 to about 7 weight percent. The preferred acrylic resin appears to be superior over prior art sealant components in that they combine the anhydrous and fast drying features found in the butadiene rubber co-polymer products, making the present invention resistent to temperature extremes, with the low viscosity, pliability and resealing characteristics of latex based product to result in a reliable and durable puncture seal.

The sealant features are obtained following the introduction of the resin in solution into the tire cavity whereupon the composition undergoes evaporation and oxidation to form the sealant layer. Alternatively, other thermoplastic polymers and/or co-polymers of acrylic acid, methacrylic acid and/or esters of these acids as are known in the art as having similar characteristics to those set out above are contemplated alone, in combination with the above or related resins and include but are not limited to:

ethyl acrylate, methyl acrylate, methyl methacrylate, ethyl methacrylate, n-butyl methacrylate, isobutyl acrylate, isobutyl methacrylate, hexyl methacrylate, t-butyl acrylate, cyclohexyl acrylate, cyclohexyl methacrylate, n-octyl acrylate, n-octyl methacrylate, dodecyl acrylate, dodecyl methacrylate, phenyl acrylate, phenyl methacrylate, lauryl acrylate, lauryl methacrylate, cetyl acrylate, cetyl methacrylate, tetrahydrofurfuryl methacrylate, benzyl methacrylate.

Applicant employs a solvent suitable for solubilizing the resin component and subsequently delivering the solvent to the tire cavity. The preferred solvent is perchloroethylene although other solvents could be used including 1,1,1 trichloroethane, 1,1 dichloro 2,2,2-trifluoroethane, methylene chloride, tetrachloroethane, trichloroethylene, 1,2-dichloro 2,2-difluoroethane, 1,1-dichloro 1 fluoroethane. Chlorofluorocarbon solvents are viable alternatives to the preferred solvents but largely undesirable due to the adverse effects previously discussed with related propellants. These solvents are contemplated as used or either alone or in combinations of varying proportions. Additionally, one or more of these solvents may be combined with flammable solvents such as acetone, or dimethyl ether in quantities that permit the overall formulation to remain essentially non-flammable (generally less than 10%). Perchloroethylene is not thought to have adverse effects on the tire rubber or wheel rims, including aluminum rims.

The solvent is present in the solvent component of the tire sealant and inflator composition in an amount from 10-90 weight percent but more preferably 20-75 weight percent. The presence of the resin base solvent system also serves to depress, at least in part, the vapor pressure of HCFC propellants to a level suitable for safe packaging as is known in the art.

Although, the preferred solvents possess a certain degree of vapor depressant properties, it is oftentimes either necessary and/or desirable to further depress the vapor pressure of certain propellants, specifically chlorodifluoromethane. It logically follows that as the volume of chlorodifluoromethane increases the amount of vapor depressant components may require a proportional increase. Dichlorofluoroethane, known commercially Genetron ® 141b has been found effective for this purpose and is included in formulations using chlorodifluoromethane in an amount ranging from 1–20% and more preferably 5–15 weight percent.

As generally described above, the acrylic resin/solvent composition has proved effective for sealing significant puncture wounds in the road contacting surface of the vehicle tire. Upon introduction of the formulation into the cavity of the tire and the simultaneous inflation of the same, the resin/solvent is dispersed in liquid droplets and adhesive to the inner surface throughout the tire. As the resin/solvent composition is a liquid possessing relatively low viscosity causing a portion of that dispensed to cumulate by gravity to the bottom of the tire cavity. However, upon rotation of the tire, aided by outwardly directed pressure caused by centrifugal force, the residual resin/solvent component fills the puncture wound and places a thin coat of resin/solvent on the inner surface of the tire which quickly dries and oxidizes. This process is repeated through continued rotation of the tire until no residual solvent/resin remains, resulting in successive layers of sealant being applied to the inner wall of the tire. Similarly, a puncture wound will receive repeated application of resin/solvent which constantly reduces the diameter of the hole until an effective and essentially permanent seal is created. In order to maximize the amount of sealant component which comes into contact with the puncture, the product should be introduced into the tire when the valve stem is positioned at the lowest point of its rotation.

Although not found to be required further ingredients such as dispersion agents, rust inhibitors, etc. may be added as are known in the art.

This process is relatively unaffected in circumstances where the puncturing item, such as a nail or the like remains in the hole, except in instances of obviously large diameter tire punctures. The present formulation, while not totally ineffective, is oftentimes and understandably less effective in repairing tears in the tire.

Although the present formulation is intended in many cases to permanently seal the puncture site, the propellant used to inflate the tire is not intended to remain in the tire for extended periods of time. Following repair of a tire using the present composition, at the earliest opportunity the propellant should properly be removed from the tire and the tire reinflated to recommended pressure using compressed air.

While applicants' anhydrous, non-flammable sealant and inflator composition is disclosed generally above, preferred embodiments are further discussed and illustrated with reference to the examples below. However, the following examples are presented to illustrate the invention and not considered as limitations thereto.

EXAMPLE 1

A tire sealant and inflator composition of the following formula was prepared, tested and found to effectively seal a puncture created by an eight penny nail in a 185/70 R14 tire.

| Sealant Component | Wt. % Amount |
|---|---|
| Doresco ® Acrylic Resin AC 209-13* (in perchloroethylene) | 21.2 |
| Perchloroethylene solvent | 65.8 |
| Dichlorofluoroethane (HCFC-141b) | 13 |
| | 100.0 |

*Resin is in solution, comprising approximately 5% nonvolatile solid.

8.25 ounces of sealant component was combined with 4 ounces of chlorodifluoromethane propellant and dispensed from a 2Q aerosol can. This formulation inflated the tire to 11 psig which after five minutes on the road increased to 16 psig. Subsequent tests yielded successful sealing of single punctures created by sixteen and twenty penny nails as well as multiple punctures by eight penny nails.

Further successful sealing of punctures was achieved wherein an eight penny nail remained in the tire and the tire was thereafter sealed using the above formulation and rotated for 5 minutes. The nail was thereafter removed and upon further rotation the puncture was effectively resealed.

EXAMPLE 2

| Sealant Component | Wt. % Amount |
|---|---|
| Doresco ® Acrylic Resin AC209-13* (in perchloroethylene) | 26 |
| Perchloroethylene Solvent | 74 |
| | 100.0 |

*Resin in solution comprising approximately 5% nonvolatile solid.

EXAMPLE 3

| Sealant Component | Wt. % Amount |
|---|---|
| Doresco ® Acrylic Resin AC209-13* | 21.4 |
| Perchloroethylene Solvent | 60.6 |
| Acetone Solvent | 5.0 |
| Dichlorofluoroethane | 13.0 |
| | 100.0 |

*Resin is in solution, comprising approximately 5% non-volatile solid.

6 3/4 ounces of the above sealant component when mixed with 5 1/2 ounces of a blend of 75% chlorodifluoromethane and 25% difluoromonochloroethane used as a propellant, is thought to yield similar results to those achieved in Example 1. * Resin in solution comprising approximately 5% nonvolatile solid.

8 ounces of sealant component was combined with 4.25 ounces of chlorodifluoromethane propellant in a sixteen (16) ounce 2Q can. The resulting formulation effectively sealed a puncture caused by an eight penny nail and inflated the tire to approximately 17 psig. The acetone is present in such minor quantity that the overall product formulation remains non-flammable under regulatory guidelines.

EXAMPLE 4

| Sealant Component | Wt. % Amount |
|---|---|
| Doresco ® Acrylic Resin 209-13 | 32 |
| Perchloroethylene Solvent | 55 |
| Dichlorofluoroethane (141b) | 13 |
| | 100.0 |

The above tire sealant and inflator composition is thought to be effective in sealing an eight, sixteen or twenty penny nail puncture in a tire when mixed in a sealant component/propellent ratio of 8¼ ounces to 4 ounces. The resulting tire pressure following rotation for at least five (5) minutes is calculated at 11-13 psig in a P205 75 R15 tire.

EXAMPLE 5

| Sealant Component | Wt. % Amount |
| --- | --- |
| Doresco ® Acrylic Resin AC209-13. | 31.7 |
| Dichlorofluoroethane | 11.9 |
| 1,1,1 Trichloroethylene | 56.4 |
| | 100.0 |

6.5 ounces of the foregoing sealant component was combined with 5.75 ounces of chlorodifluoromethane propellant in a 16 oz. 2Q aerosol can. The formulation as dispensed sealed a P205 75 R15 tire and inflated it to 17 psig. Upon rotation the internal tire pressure increased to 20 psig. This pressure remained constant over the 72 hour observation period.

The percentage of resin/solvent component and propellant are essentially, although not exclusively, inversely proportional. Logically, a higher percentage of propellant provides better inflator qualities to the overall composition while, within certain ranges, a higher percentage of resin/solvent yields better tire sealing qualities. The most preferred formulations seek a balance between the two extremes resulting in a product having effective sealing characteristics in conjunction with adequate inflating properties.

The propellant is present in the final formulation in an amount of between 10-60 weight percent, depending on the sealant versus inflator balance design from the final product. More preferably propellant present in an amount between 20-40 weight percent, and even more preferably 25-35 weight percent, yields a product with suitable sealant and inflator qualities.

The following example is illustrative of a tire sealant and inflator composition which could effectively seal a small puncture but yield higher inflation pressures than formulations previously disclosed herein. Similarly, it should be appreciated that the sealant and inflator (propellent) rates disclosed in previous examples could be varied in accordance with the relationship previously explained.

EXAMPLE 6

| Sealant Component | Wt. % Amount |
| --- | --- |
| Doresco ® Acrylic Resin AC209-13 (in perchloroethylene) | 7.5 |
| Perchloroethylene solvent | 50 |
| Dichlorofluroethane (141b) | 42.5 |
| | 100.0 |

Five ounces of the foregoing sealant component mixed with 7 1/4 ounces of chlorodifluoromethane propellant is calculated to seal a puncture created by an eight penny nail and inflate a P205 75 R15 tire to 21 psig, which upon rotation is expected to increase to 24-26 psig.

While in accordance with the patent statutes, the best mode and preferred embodiments of the invention have been described, it is to be understood that this invention is not limited thereto, but rather is to be measured by the scope of the spirit of the appended claims.

What is claimed is:

1. An anhydrous, essentially nonflammable sealant and inflator composition for introduction into an interior of a pneumatic tire through a valve stem, comprising:
   10 to 90 weight percent of a propellant;
   90 to 10 weight percent of a solvent; and
   0.1 to 30 weight percent of a one part air dryable thermoplastic acrylic resin selected from the group consisting of an acrylic acid polymer, an acrylic acid copolymer, a methacrylic acid polymer, a methacrylic acid copolymer and ester derivatives thereof, substantially dissolved in said solvent, said resin forming a continuous coating on an interior surface of a tire cavity about a puncture in said tire, through non-foaming evaporation of said solvent and rotation of said tire.

2. The anhydrous, essentially nonflammable sealant and inflator composition of claim 1 wherein said propellant comprises at least one member selected from the group consisting of hydrochlorofluorocarbons, hydrofluorocarbons, chlorofluorocarbons and mixtures thereof.

3. The anhydrous, essentially nonflammable sealant and inflator composition of claim 2 wherein said propellant comprises chlorodifluoromethane.

4. The anhydrous, essentially nonflammable sealant and inflator composition of claim 2 wherein said propellant comprises tetrafluoroethane.

5. The anhydrous, essentially nonflammable sealant and inflator composition of claim 2 wherein said propellant further comprises from 0.5 to 15 weight percent of at least one member selected from the group consisting of propane, isobutane, n-butane and dimethyl ether.

6. The anhydrous, essentially nonflammable sealant and inflator composition of claim 1 wherein said solvent comprises at least one member selected from the group consisting of perchloroethylene, 1,1,1 trichloroethane, 1,1 dichloro 2,2,2-trifluoroethane, methylene chloride, tetrachloroethane, trichloroethylene, 1,2-dichloro 2,2-difluoroethane, 1,1-dichloro 1-fluoroethane, and mixtures thereof.

7. The anhydrous, essentially nonflammable sealant and inflator composition of claim 6 wherein said solvent comprises perchloroethylene.

8. The anhydrous, essentially nonflammable sealant and inflator composition of claim 6 wherein said solvent comprises 1,1,1 trichloroethane.

9. The anhydrous, essentially nonflammable sealant and inflator composition as recited in claim 1 wherein said solvent further comprises 0 to 15 weight percent of a solvent selected from the group consisting of acetone, ketones, esters, ethers and mixtures thereof.

10. The anhydrous, essentially nonflammable sealant and inflator composition of claim 1 wherein said acrylic resin comprises one or more polymers of acrylic and methacrylic monomers and/or derivatives thereof.

11. The anhydrous, essentially nonflammable sealant and inflator composition as recited in claim 1 wherein said composition further comprises 0.1 to 2.5 percent of a corrosion inhibitor.

12. The anhydrous, essentially nonflammable sealant and inflator composition of claim 1 wherein said resin is present in a solvent which comprises at least one member from the group consisting of perchloroethylene, 1,1,1 trichloroethane, 1,1 dichloro 2,2,2-trifluoroethane, methylene chloride, tetrachloroethane, trichloroethylene, 1,2-dichloro 2,2-difluoroethane, 1,1-dichloro 1-fluoroethane, and mixtures thereof.

13. The anhydrous, essentially nonflammable sealant and inflator composition of claim 12 wherein said resin solvent comprises perchloroethylene.

14. The anhydrous, essentially nonflammable sealant and inflator composition of claim 12 wherein said resin solvent comprises 1,1,1 trichloroethane.

15. The anhydrous, essentially nonflammable sealant and inflator composition as recited in claim 1 wherein said composition is a pneumatic tire sealant and inflator.

16. An anhydrous, essentially nonflammable sealant and inflator composition for introduction into an interior of a pneumatic tire through a valve stem, comprising:
   20 to 60 weight percent of a propellant;
   75 to 20 weight percent of a solvent; and
   1 to 20 weight percent of a one part air dryable thermoplastic acrylic resin selected from the group consisting of an acrylic acid polymer, an acrylic acid copolymer, a methacrylic acid polymer, a methacrylic acid copolymer and ester derivatives thereof, substantially dissolved in said solvent, said resin forming a continuous coating on an interior surface of a tire cavity about a puncture in said tire, through non-foaming evaporation of said solvent and rotation of said tire.

17. The anhydrous, essentially nonflammable sealant and inflator composition of claim 16 wherein said propellant comprises at least one member selected from the group consisting of hydrochlorofluorocarbons, hydrofluorocarbons, chlorofluorocarbons and mixtures thereof.

18. The anhydrous, essentially nonflammable sealant and inflator composition of claim 17 wherein said propellant comprises chlorodifluoromethane.

19. The anhydrous, essentially nonflammable sealant and inflator composition of claim 17 wherein said propellant comprises tetrafluoroethane.

20. The anhydrous, essentially nonflammable sealant and inflator composition of claim 17 wherein said propellant further comprises from 0.5 to 15 weight percent of at least one member selected from the group consisting of propane, isobutane, n-butane and dimethyl ether.

21. The anhydrous, essentially nonflammable sealant and inflator composition of claim 16 wherein said solvent comprises at least one member selected from the group consisting of perchloroethylene, 1,1,1 trichloroethane, 1,1 dichloro 2,2,2-trifluoroethane, methylene chloride, tetrachloroethane, trichloroethylene, 1,2-dichloro 2,2-difluoroethane, 1,1-dichloro 1-fluoroethane, and mixtures thereof.

22. The anhydrous, essentially nonflammable sealant and inflator composition of claim 18 wherein said acrylic resin comprises one or more polymers of acrylic and methacrylic monomers and/or derivatives thereof.

23. The anhydrous, essentially nonflammable sealant and inflator composition as recited in claim 16 wherein said composition further comprises 0.1 to 2.5 percent of a corrosion inhibitor.

24. The anhydrous, essentially nonflammable sealant and inflator composition of claim 16 wherein said resin is present in a solvent which comprises at least one member from the group consisting of perchloroethylene, 1,1,1 trichloroethane. 1,1 dichloro 2,2,2-trifluoroethane, methylene chloride, tetrachloroethane, trichloroethylene, 1,2-dichloro 2,2-difluoroethane, 1,1-dichloro 1-fluoroethane, and mixtures thereof.

25. As an article of manufacture, an aerosol container comprising a sealant and an inflator composition comprising:
   1 to 20 weight percent of a one part air dryable acrylic resin selected from the group consisting of an acrylic acid polymer, an acrylic acid copolymer, a methacrylic acid polymer, a methacrylic acid copolymer and ester derivatives thereof;
   20 to 75 weight percent of a solvent; and
   20 to 60 weight of a propellant giving said aerosol container an initial pressure ranging from about 20 to 110 pounds per square inch gauge, measured at 70 degrees Fahrenheit, thereby permitting a user to seal a pneumatic tire by the application of said sealant to an interior of said tire through a valve stem on said tire.

26. An article of manufacture as recited in claim 25, wherein the combination of said resin and said solvent occupies from about 10 to 80 percent of the volume of said container.

27. The anhydrous, essentially nonflammable sealant and inflator composition of claim 1 wherein said acrylic resin is a co-polymer comprising an alkyl ester of acrylic acid and an alkyl ester of methacrylic acid.

28. The anhydrous, essentially nonflammable sealant and inflator composition as recited in claim 27 wherein said acrylic resin has a glass transition of less than 20° C.

29. The anhydrous, essentially nonflammable sealant and inflator composition of claim 16 wherein said acrylic resin i a copolymer comprising an alkyl ester of acrylic acid and an alkyl ester of methacrylic acid.

30. The anhydrous, essentially nonflammable sealant and inflator composition of claim 16 wherein said acrylic resin has a glass transition of less than 20° C.

* * * * *